P. & G. C. ROSE.

Machine for Separating the Fibers of Wood for Paper-Pulp.

No. 9,110. Reissued Mar. 9, 1880.

Witnesses
A. Ruppert.
James H. Lange.

Inventors.
Peleg and Geo. C. Rose.
per Edson Bros.
Attorneys.

N. PETERS, PHOTO-LITHOGRAPHER, WASHINGTON, D. C.

UNITED STATES PATENT OFFICE.

PELEG ROSE AND GEORGE C. ROSE, OF NORWICH, CONNECTICUT.

MACHINE FOR SEPARATING THE FIBERS OF WOOD FOR PAPER-PULP.

SPECIFICATION forming part of Reissued Letters Patent No. 9,110, dated March 9, 1880.

Original No. 207,553, dated August 27, 1878. Application for reissue filed December 17, 1878.

*To all whom it may concern:*

Be it known that we, PELEG ROSE and GEO. C. ROSE, of Norwich, in the county of New London and State of Connecticut, have invented certain new and useful Improvements in Machines for Separating the Fibers of Wood for Paper-Pulp; and we do hereby declare that the following is a full, clear, and exact description of the invention, that will enable others skilled in the art to which it appertains to make and use the same, reference being had to the accompanying drawings, and to the letters of reference marked thereon, which form a part of this specification, and in which—

Figure 1:
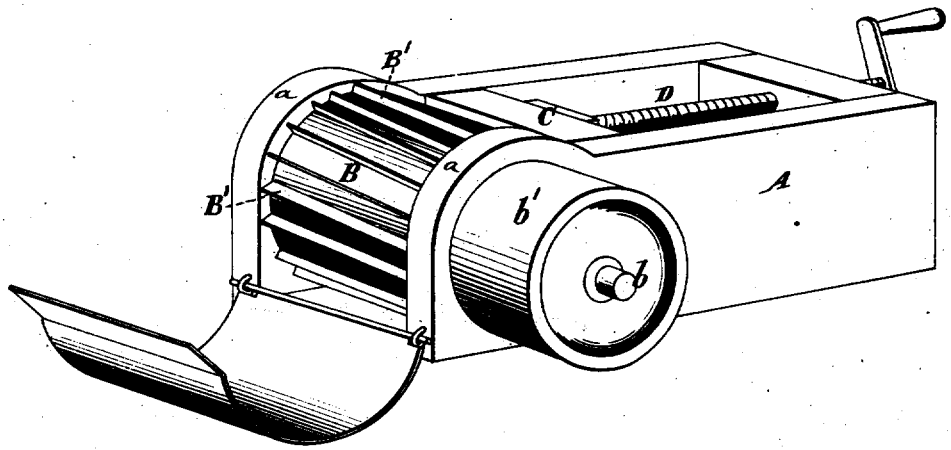
Figure 2:
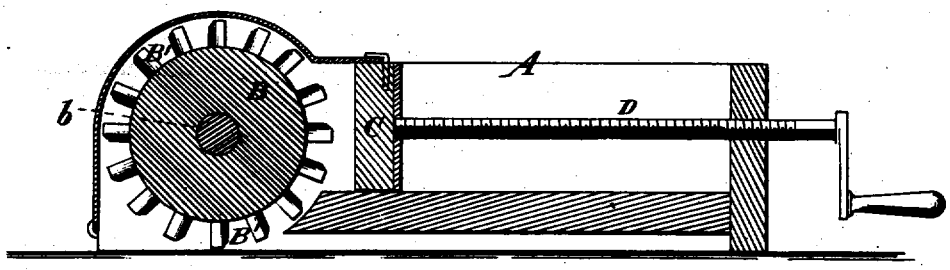

Figure 1 is a perspective view, and Fig. 2 a longitudinal vertical section.

This invention relates to that class of machines constructed for the purpose of preparing from wood a fibrous pulp to be used in the manufacture of paper; and the novelty consists in the construction of a revolving cylinder carrying spiral scrapers, arranged in relation to a feed-chute and a follower with operating mechanism, as will be more fully hereinafter set forth.

Referring to the drawings, A represents a suitably-constructed box or hopper, at one end of which is arranged a shaft, *b*, carrying a cylinder, B, which fits between the sides *a a* of the box, and adapted to revolve therein.

Upon the cylinder B are arranged a series of spiral scrapers, B′ B′, having sharp edges, and of a construction generally resembling ordinary tools for scraping wood. The spiral form gives a drawing cut, and prevents jerking as the scrapers engage or let go of the wood. These spiral scrapers are arranged any desired distance apart, and are secured to the cylinder in any proper manner.

D represents the follower in the box A, operated by a hand-screw, as shown. *b′* represents a power-pulley.

To separate the fibers of wood in the manufacture of paper-pulp, rotary motion is imparted to the shaft B. The block of wood is placed in the box or feed-chute A and firmly held and pressed against the spiral scrapers, which separate the fiber from the block, the fineness of which is regulated by the pressure upon the wood operated upon. Suitable provision is made for the reception of the fibrous pulp thus made.

We are aware that numerous automatic feeding devices have been employed in this class of machines to feed the wood to the stone or scrapers—viz., such as feeding-rolls, racks, and pulleys operated by weights, and rods operated by spring-ratchets; but to these we lay no claim, as the fiber can be better regulated as to fineness by the construction herein shown and described.

What we claim as new, and desire to secure by Letters Patent, is—

1. In a wood-fiber-separating machine, the cylinder B, provided with a series of spirally-arranged scrapers, B′ B′, adapted to give a drawing scrape upon the wood without jerking, in combination with a feeding-chute for feeding the block and feeding mechanism operated at will, as herein set forth.

2. In a wood-fiber-separating machine, the cylinder B, provided with a series of scrapers, B′ B′, in combination with a holding and feeding chute, A, for holding the block and feed mechanism operated by hand to press the billet of wood against the scrapers, as specified.

3. In a wood-fiber-separating machine, the combination, with the rotary cylinder B, having scrapers B′ B′, of the follower D, operated by the hand-screw, substantially as specified.

In testimony that we claim the foregoing we have hereunto set our hands this 13th day of December, 1878.

PELEG ROSE.
GEORGE C. ROSE.

Witnesses:
LUCIUS BROWN,
JOAB B. ROGERS.